Nov. 22, 1960 L. M. CARVER 2,961,489

TELEGRAPH SINGLE SPACE OR MARK PULSE DISTORTION MONITOR

Filed May 23, 1957 2 Sheets-Sheet 1

INVENTOR.
*Lawrence M. Carver*
BY Edwin Levisohn & Harry Cohen
ATTORNEYS

INVENTOR.
Lawrence M. Carver
BY Edwin Levisohn + Harry Cohen
ATTORNEYS

United States Patent Office 2,961,489

Patented Nov. 22, 1960

2,961,489

TELEGRAPH SINGLE SPACE OR MARK PULSE DISTORTION MONITOR

Lawrence M. Carver, Springdale, Conn., assignor to Stelma, Incorporated, Stamford, Conn., a corporation of Connecticut Filed May 23, 1957, Ser. No. 661,146

20 Claims. (Cl. 178—69)

The present invention relates to a distortion monitoring apparatus for telegraph circuits.

An object of the present invention is to provide a telegraph distortion monitoring apparatus which is capable of monitoring either start-stop or synchronous signals.

Another object is the provision of a telegraph distortion monitoring apparatus wherein the shortening of a single pulse is measured or monitored as an indication of distortion.

A further object is the provision of a telegraph distortion monitoring apparatus wheren operation on 7.42 code or 7.0 code is possible.

A still further object is the provision of a telegraph distortion monitoring apparatus of highly novel construction which is simple in design and of relatively small size and which can be manufactured and sold at a relatively low cost.

The above and other objects, features and advantages of the present invention will be more fully understood from the following description considered in connection with the accompanying illustrative drawings.

In the drawings which illustrate the best modes presently contemplated of carryng out the invention:

The function of a monitor on a telegraph circuit is to provide an alarm when the circuit distortion exceeds a predetermined amount. Thus, a faulty or failing circuit can be indicated before excessive teleprinted copy is lost. In cases where a teleprinter may be printing bad copy, a monitor in the same circuit will indicate whether the teleprinter or circuit to the teleprinter is at fault. If the teleprinter is printing bad copy while the distortion monitor alarm is not being activated, the teleprinter is maladjusted or faulty. If the alarm shows excessive distortion, the circuit to the teleprinter is at fault.

Figure 1:
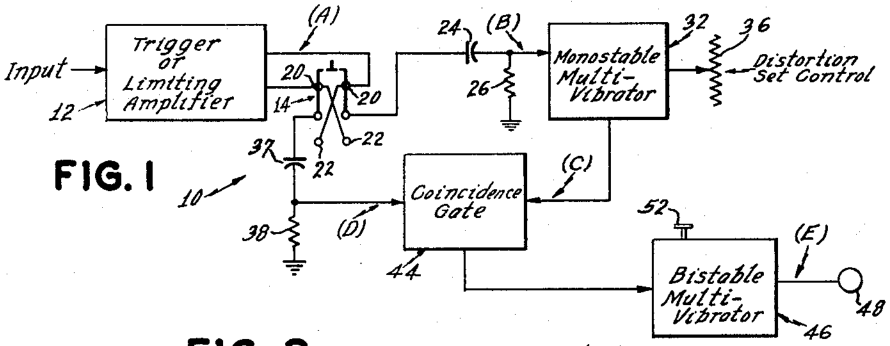
Fig. 1 is a block diagram of a monitoring apparatus for a telegraph circuit pursuant to the present invention.
Figure 2:
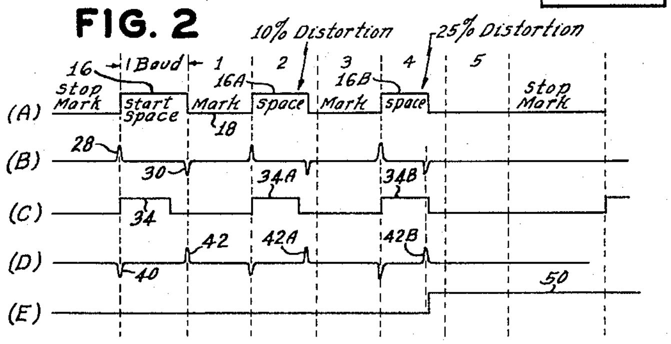
Fig. 2 is a wave form chart of the character Y in 7.42 code signal which is utilized in describing the operation of Figure 1.

Referring now to Figures 1 and 2 of the drawings in detail, Figure 1 illustrates a block diagram of a monitoring apparatus, generally indicated by the reference numeral 10, pursuant to the present invention for monitoring a telegraph circuit for distortion, with the various wave forms in said circuit, occurring for the character Y in 7.42 code signal, at the points designated therein by the letters A, B, C and D, being illustrated in Figure 2. Input signal from the telegraph circuit is applied to the first stage 12 of the monitoring apparatus 10. The stage 12 is constituted by a trigger or limiting amplifier circuit which functions to square up the input teleprinter signal so that a uniform square wave signal is available at the output of the stage 12 to operate the following circuits. A typical telegraph loop signal for the letter Y in 7.42 code is illustrated in Figure 2, line A, said signal being shown as occurring at the output of the trigger or limiting amplifier stage 12 and constituting a uniform square wave. Provision is made for a double-pole double-throw switch 14 at the output of stage 12, so as to allow for the monitoring of distortion, either in terms of the shortening of single space pulses 16, which would represent marking bias, or the shortening of single mark pulses 18, which would represent spacing bias. Only one biased condition is monitored at a time, depending upon the position of the switch 14. It will be understood that with the switch closed at the terminals 20—20, as illustrated, shortening of the space pulse is monitored, and with the switch closed at the terminals 22—22, shortening of the mark pulse is monitored. One side of the switch is connected to a differentiating circuit constituted by the capacitor 24 and the resistor 26 in series therewith, the latter being connected to ground as shown.

The differentiating circuit operates to differentiate the signal at the output of the trigger circuit 12 to provide the positive trigger pulse 28 and the negative trigger pulses 30, as shown in lines B of Figure 2. The positive pulses 28 trigger a monostable multi-vibrator stage 32 to provide the square wave output pulses 34 illustrated in line C of Figure 2. The duration of the pulse 34 is determined by the setting of a distortion set control 36 provided in the stage 32. The control 36 is set for 80% of the normal baud length. The normal baud length is shown by the length of the start pulse 16 in line A of Figure 2, and a comparison of the first pulse 34 in line C with said start pulse 16, will show that the time duration of said pulse 34 is 80% of the time duration of the pulse 16. By setting the duration of the pulses 34 at 80% of the normal baud length, provision is made for an alarm to be activated when the marking bias or distortion exceeds 20%, as hereinafter described in detail.

A second differentiating circuit is provided at the other end or side of the switch 14, said circuit being constituted by the capacitor 37 in series with the resistor 38, the latter being connected to ground as shown. However, the signal applied to the differentiating circuit 37—38 is of opposite polarity to the signal applied to the first mentioned differentiating circuit 24—26, the differentiating circuit 37—38 providing the negative pulses 40 and the positive trigger pulses 42, as shown in line D of Figure 2. It will be noted that for each positive trigger pulse 28 provided by the differentiating circuit 24—26 there is provided at the same time a negative trigger pulse 40 by the second differentiating circuit, and for each negative pulse 30 of the first differentiating circuit there is provided at the same time a positive trigger pulse 42 by the second differentiating circuit.

The distortion monitoring operation is actually performed in the coincidence gate circuit 44. It will be noted that said coincidence gate circuit receives the trigger pulses provided by the second differentiating circuit 37—38, as shown in line D of Figure 2, and also receives the square wave pulses 34 provided by the monostable multivibrator stage 32. When a positive pulse 42 of line D in Figure 2, coincides in time with a positive pulse 34 of line C, at the coincidence gate circuit 44, said circuit 44 passes the postive pulse of line D to the bistable trigger stage 46 which is triggered thereby to energize an alarm lamp 48. The signal provided at the output of the bistable stage 46 is shown at 50 in line E of Figure 2. A reset switch 52, associated with the bistable stage 46, allows the alarm lamp 48 to be turned off by resetting the stage 46 to its normal waiting condition.

In line A of Figure 2 the number 2 space pulse 16A is shown with a 10% marking bias or distortion. However, it will be noted that the corresponding positive pulse 42A in line D does not occur during the time interval or duration of the corresponding positive pulse 34A of line C, but occurs after the termination of said pulse 34A. Under these conditions, the pulse 42A will not be passed by the coincidence gate circuit 44, so that the bistable stage 46 will not be triggered and the alarm 48 will not be energized. However, the space pulse 16B at the number 4 intelligence in line A of Figure 2 has a 25% marking bias or distortion. Since the corresponding positive pulse 34B of line C is set for 20% distortion monitoring, the corresponding positive pulse 42B of line D occurs 5% of a baud before the end or termination of the positive pulse 34B, so that a positive pulse will appear at the output of the coincidence stage 44 to trigger the bistable stage 46 to energize the alarm 48. Consequently, it will be apparent that any shortening causing distortion of the input space pulses 16 beyond the 20% distortion point thereof will allow a pulse 42 to pass through the coincidence gate circuit 44 to energize the alarm 48. The distortion set control 36 can be adjusted to regulate the duration of the pulses 34 to any desired time relation so that the circuit can be made to monitor and provide an alarm when the distortion exceeds any preset percentage.

The double-pole double-throw switch 14 at the output of the trigger stage 12 allows the apparatus 10 to monitor distortion due to the shortening of a single mark pulse 18 of the telegraph signal in the same manner as described for single space pulses 16 of the telegraph signal. In this connection, it will be understood that with the switch 14 engaged at the terminals 22—22 thereof, the polarities of the wave forms in lines B and D of Figure 2 would be reversed. The timing of the monostable vibrator stage 32 would be started from the start of each mark pulse so that the positive pulses 34 of line C would coincide with the marking pulses 18 rather than with the spacing pulses 16. The resultant operation for monitoring the shortening or bias of single mark pulses will be the same as that described for the monitoring of the single space pulses 16.

Figure 3:
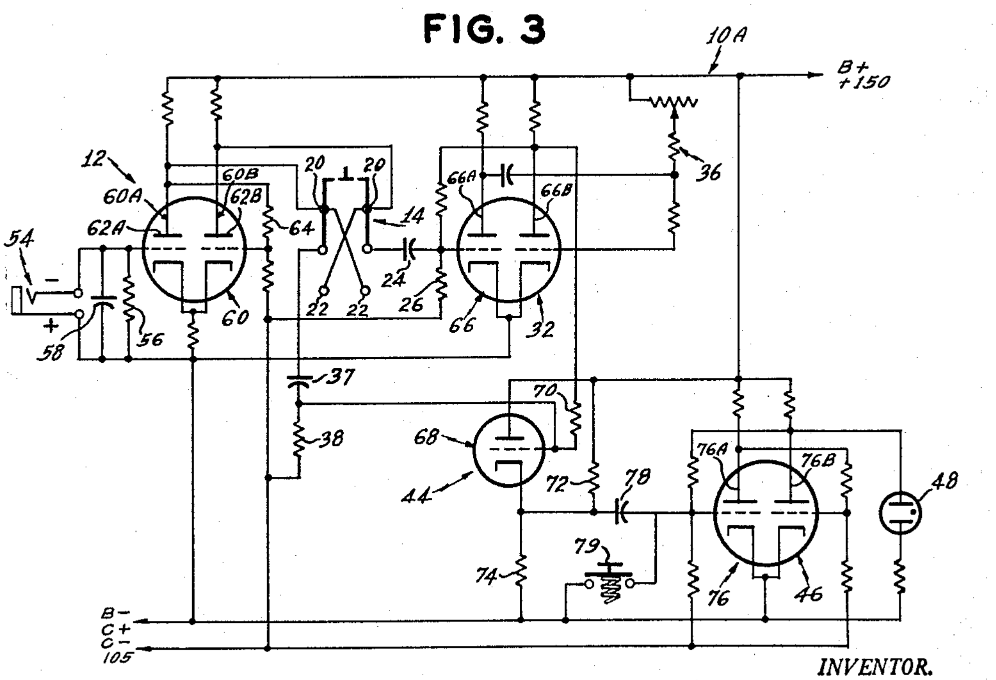
Fig. 3 is a schematic diagram of an apparatus pursuant to Figure 1 utilizing vacuum tubes.

Referring now to Figure 3 in detail, there is shown a schematic diagram, generally indicated by the reference numeral 10A, for the monitoring apparatus 10, wherein said apparatus uses vacuum tubes. The input to the circuit is provided through an input jack 54 which is connected into a conventional telegraph loop. The telegraph loop signal develops a voltage across the resistor 56 which is connected across the jack 54. A capacitor 58, in parallel with the resistor 56, serves as a filter to eliminate small duration pulses in the input signal to the circuit 10A due to noise or relay bounce, which spurious pulses or signals may otherwise produce false alarm energizations of the alarm 48.

The trigger or limiting amplifier stage 12 is constituted, as here shown, by a Schmit's direct coupled circuit utilizing the duo-triode tube 60. The signal developed across the grid resistor 56 is applied to the grid of the input half 60A of said tube to provide an output signal in the circuit of plate 62A of said half of the tube which is applied through the coupling resistor 64 to the grid of the second half 60B of said tube. This provides a signal in the circuit of plate 62B of the second half of the tube which has the wave form shown in line A of Figure 2. The output signal of plate circuit 62B is applied through the differentiator circuit 24—26 to the control grid at the input half 66A of the multivibrator tube 66 in the multivibrator stage 32. With the switch 14 closed at its contacts 20—20, as shown, the input to the tube section 66A is shown in line B of Figure 2, with the tube triggered by the positive pulses 28. The output from the section 66B of the multivibrator tube 66 which, as previously indicated, is constituted by a monostable multivibrator, is constituted by the square wave pulses 34 shown in line C of Figure 2. The distortion set control 36 is constituted by a variable resistor connected to the B plus supply and provides a positive bias on the control grid of the tube section 66B to regulate the duration of the positive pulses 34. The positive pulses 34 are applied to the control grid of tube 68 in the coincidence gate circuit 44, through a coupling resistor 70. With the switch 14 closed at the contacts 20—20 the capacitor 37 and the resistor 38 differentiate the signal present at the plate 62A of the trigger tube 60 to supply a signal to the control grid of the tube 68 which is constituted by the voltage pulses 42 as shown in line D of Figure 2.

The coincidence gate tube 68 is a cathode follower which is normally severely biased to cut off by resistors 72 and 74 which apply a positive voltage to the cathode of tube 68 relative to the grid thereof. When the multivibrator stage 32 is in cycle, it applies a positive voltage to the control grid of the coincidence tube 68 so that the tube 68 is biased just to the point of cut off. If a positive pulse 42 is applied to the control grid of the tube 68, through the capacitor 37, while the multivibrator tube 66 is in cycle, the pulse will appear at the cathode of the tube 68 and will trigger the tube 76 of the bistable trigger stage 46. More specifically, it will be noted that the cathode of tube 68 is coupled through the capacitor 78 to the control grid of the input half 76A of the tube 76. With the input half 76A of tube 76 triggered through the capacitor 78, the plate of the other tube section 76B will become positive so as to ignite the neon alarm lamp 48 which is connected between the plate and cathode of the tube section 76B of the bistable multivibrator 76. A spring return push button switch 79 is connected between the control grid of the input half 76A of tube 76 and B minus and functions as a reset switch, which when closed, resets the bistable stage 76 and extinguishes the ignition of the lamp 48 so as to turn out the alarm.

Figure 4:
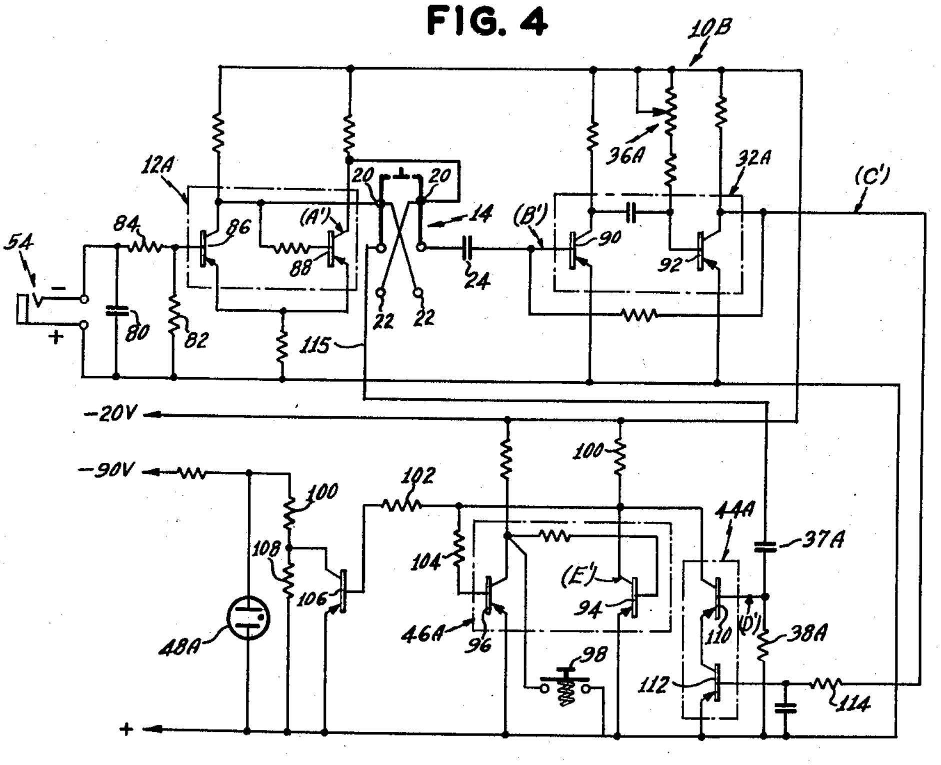
Fig. 4 is a schematic wiring diagram of a circuit pursuant to Figure 1 utilizing transistors.
Figure 5:
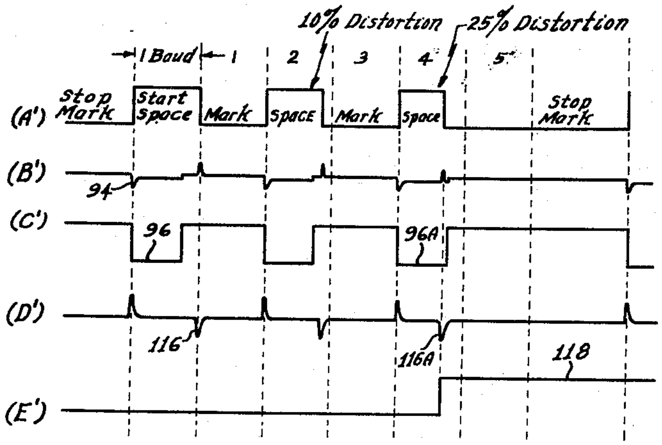
Fig. 5 is a wave form chart illustrating typical wave forms utilized in the explanation of the operation of the circuit of Figure 4.

Referring now to Figure 4 in detail, there is shown a telegraph distortion monitoring apparatus 10B which provides the same functions as the apparatus 10A but which is provided with transistors in lieu of the vacuum tubes of the apparatus 10A. Figure 5 illustrates the wave form of the character Y in 7.42 code signal at various parts of the circuit shown in Figure 4, said parts being indicated by the corresponding line designation in Figure 5. While the circuit shown in Figure 4 utilizes P-N-P transistors, it will be understood that N-P-N transistors could be used equally well in said circuit. The input to the circuit 10B is provided through an input jack 54, as previously described, from which the incoming telegraph signal is applied to an R-C network consisting of the capacitor 80 connected across the jack, the resistor 82 connected in series with resistor 84, the series combination in parallel with the capacitor 80, and the resistor 84 connected between the capacitor and the base of transistor 86. The transistors 86 and 88 form a trigger or limiting amplifier stage 12A which squares up the incoming telegraph signal. It will be noted that the network constituted by the capacitor 80 and the resistors 82 and 84 is connected in the base circuit of the transistor 86 and acts as a filter to eliminate short duration pulses caused by the noise of relay bounce which may otherwise cause false energization of the alarm device. The wave form at the collector of transistor 88 is shown in line A′ of Figure 5 and it will be noted that the trigger circuit 12A squares up the telegraph signal in the same manner as the trigger circuit 12 in Figure 3. The wave form at the collector of the transistor 86 is identical to that shown in line A′ of Figure 5 except for reversed polarity. The double-pole double-throw switch 14 at the output of the trigger stage 12A allows the monitoring apparatus 10B to measure the shortening or distortion of either single space or single mark pulses, exactly as described in connection with the vacuum tube monitoring apparatus 10A. The transistors 90 and 92 form a monostable multivibrator 32A. The capacitor 24 between the switch 14 and the base of the transistor 90 functions as the trigger capacitor and triggers the multivibrator circuit 32A into its unstable state whenever a negative pulse 94, line B′ of Figure 5, is applied to the base of the transistor 90. A distortion set control 36A is provided by the variable resistor which is connected between the base of the transistor 92 and the source of negative voltage, here shown as a minus 20 volt source. By varying the magnitude of the negative voltage applied to the base of the transistor 92, the duration of the output pulses 96 at the collector of transistor 92 may be varied, said pulses being shown in line C′ of Figure 5.

Transistors 94 and 96 form a bistable trigger or flip-flop trigger circuit 46A. A spring operated or push button reset switch 98 allows the collector of the transistor 96 to be grounded manually setting the trigger circuit to its normal or non-alarm energizing condition. Transistor 96 will normally be conducting and transistor 94 will normally be in a non-conducting condition. Electrons will flow from the minus 20 volt source through the resistor 100 to the collector of the transistor 94. Since the transistor 94 is non-conductive, this current will divide through the resistors 102 and 104 which are connected, respectively, to the base of transistor 106 and the base of transistor 96 and holds said transistors 96 and 106 in a current conducting condition. It will be noted that transistor 106 is connected in parallel with the resistor 108, which with the resistor 100 forms a voltage divider network in parallel with the neon alarm device 48A. Consequently, as long as the transistor 106 is in a conductive condition, it will short the resistor 108 and reduce the potential drop across the neon tube 48A below the ionization level thereof thus keeping the tube 48A extinguished.

The series connected transistors 110 and 112 form a coincidence or "And" gate circuit 44A. The collector of the transistor 92 in the monostable multivibrator stage 32A is connected through a resistor 114 to the base of the transistor 112. Consequently, whenever the monostable multivibrator stage 32 is in its unstable condition, the collector of the transistor 92 will be negative and current will flow through the resistor 114 to the base of the transistor 112 and make this transistor potentially conductive. The wave form at the collector of the transistor 92 is shown in line C′ of Figure 5.

Since the transistors 110 and 112 are in series circuit no current will flow through said transistors unless both are in a current conducting condition. The transistor 110 is controlled by the telegraph signal which is coupled from the trigger circuit 12A to the base of the transistor 110 through the lead 115 and a differentiating network comprising the capacitor 37A and the resistor 38A. The wave form of the signal applied at the base of the transistor 110 is shown in line B′ of Figure 5.

When the wave form 96 at the base of the transistor 112 and when the wave form at the base of the transistor 110 are both negative at the same time, that is when a coincidence condition is provided, as indicated by the negative wave or pulse 116A in line D′ of Figure 5 and the negative pulse 96A in line C1, for the intelligence baud number 4, both the transistors 110 and 112 conduct and the collector of the transistor 94 is grounded therethrough. Consequently, the bistable trigger stage 46A is triggered to its alarm condition with the transistor 94 conducting and the transistor 96 non-conducting. With the transistor 94 conducting, the current into the base of the transistor 106 is cut off, so that said transistor 106 becomes non-conducting. This removes the short across the resistor 108 and allows the voltage drop across the neon tube 48A to rise sufficiently to cause ionization of the latter. The wave form of the signal provided at the collector of the transistor 94 is shown at 118 in line E′ in Figure 5.

In view of the foregoing, it will be apparent that both the vacuum tube circuit 10A and the transistor circuit 10B function in a similar manner to energize the coincidence gate circuit or stage 44, or 44A, as the case may be, when the differentiated telegraph signal at the output of the trigger stage 12 or 12A coincides in the gate circuit with the output of the monostable multivibrator stage 32 or 32A, as the case may be, to energize the bistable multivibrator 46 or 46A.

While I have shown and described the preferred embodiments of my invention, it will be understood that various changes may be made in the present invention without departing from the underlying idea or principles of the invention within the scope of the appended claims.

Having thus described my invention, what I claim and desire to secure by Letters Patent, is:

1. Telegraph distortion monitoring apparatus, comprising a normally de-energized stage adapted to provide a pulse of predetermined time duration for each energization thereof, a normally de-energized coincidence stage in circuit with the output of said first mentioned stage, means responsive to a telegraph signal pulse to provide trigger pulses simultaneously to both of said stages, said coincidence stage comprising means for providing an effective output therefrom only when the trigger pulse fed thereto from said responsive means coincides with the polarity of the time-duration pulse fed thereto from said first mentioned stage and occurs within the time period of said time-duration pulse, and means responsive to the output of said coincidence stage for energizing an indicator device.

2. Telegraph distortion monitoring apparatus, comprising a normally de-energized stage adapted to provide a pulse of predetermined time duration for each energization thereof, a normally de-energized coincidence stage in circuit with the output of said first mentioned stage, means responsive to a telegraph signal pulse to provide trigger pulses simultaneously to both of said stages, said coincidence stage comprising means for providing an effective output therefrom only when the trigger pulse fed thereto from said responsive means coincides with the polarity of the time-duration pulse fed thereto from said first mentioned stage and occurs within the time period of said time-duration pulse, a normally de-energized alarm device, and means responsive to the output of said coincidence stage for energizing said alarm device.

3. Telegraph distortion monitoring apparatus, comprising a normally de-energized stage adapted to provide a pulse of predetermined time duration for each energization thereof, a normally de-energized coincidence stage in circuit with the output of said first mentioned stage, means responsive to a telegraph signal pulse to provide trigger pulses simultaneously to both of said stages, said coincidence stage comprising means for providing an effective output therefrom only when the trigger pulse fed thereto from said responsive means coincides with the polarity of a time-duration pulse fed thereto from said first mentioned stage and occurs within the time period of said time-duration pulse, a normally de-energized alarm device, and means responsive to the output of said coincidence stage for energizing said alarm device, and means to manually reset said apparatus to de-energize said alarm device.

4. Telegraph distortion monitoring apparatus, comprising a normally de-energized stage adapted to provide a pulse of predetermined time duration for each energization thereof, a normally de-energized coincidence stage in circuit with the output of said first mentioned stage, first differentiator means responsive to a telegraph signal and operable to provide a trigger pulse to said first mentioned stage, second differentiator means responsive to said telegraph signal and operable concurrently with said differentiator means to provide a trigger pulse to said coincidence stage, said coincidence stage comprising means for providing an effective output therefrom only when the trigger pulse fed thereto from said second differentiator means coincides with the polarity of a time-duration pulse fed thereto from said first mentioned stage and occurs within the time period of said time-duration pulse, a normally de-energized alarm device, and means responsive to the output of said coincidence stage for energizing said alarm device.

5. Telegraph distortion monitoring apparatus, comprising a normally de-energized stage adapted to provide a pulse of predetermined time duration for each energization thereof, a normally de-energized coincidence stage in circuit with the output of said first mentioned stage, means for squaring a telegraph input pulse, first differentiator means in circuit between said pulse squaring means and said first mentioned stage to provide a trigger pulse for the latter, second differentiator means in circuit between said pulse squaring means and said coincidence stage and operable concurrently with said first differentiator means to provide a trigger pulse to said coincidence stage, said coincidence stage comprising means for providing an effective output therefrom only when the trigger pulse fed thereto from said second differentiator means coincides with the polarity of a time-duration pulse fed thereto from said first mentioned stage and occurs within the time period of said time-duration pulse, a normally de-energized alarm device, and means responsive to the output of said coincidence stage for energizing said alarm device.

6. Telegraph distortion monitoring apparatus, comprising a normally de-energized stage adapted to provide a pulse of predetermined time duration for each energization thereof, a normally de-energized coincidence stage in circuit with the output of said first mentioned stage, means responsive to a telegraph signal pulse to provide trigger pulses simultaneously to both of said stages, said coincidence stage comprising means for providing an effective output therefrom only when the trigger pulse fed thereto from said responsive means coincides with the polarity of a time-duration pulse fed thereto from said first mentioned stage and occurs within the time period of said time-duration pulse, a normally de-energized bistable stage in circuit with the output of said coincidence stage and triggered thereby for energizing said bistable stage, and a normally de-energized alarm device in circuit with said bistable stage and energized in response to the energization of the latter.

7. Telegraph distortion monitoring apparatus, comprising a normally de-energized stage adapted to provide a pulse of predetermined time duration for each energization thereof, a normally de-energized coincidence stage in circuit with the output of said first mentioned stage, means responsive to a telegraph signal pulse to provide trigger pulses simultaneously to both of said stages, said coincidence stage comprising means for providing an effective output therefrom only when the trigger pulse fed thereto from said responsive means coincides with the polarity of a time-duration pulse fed thereto from said first mentioned stage and occurs within the time period of said time duration pulse, and a normally de-energized bistable stage in circuit with the output of the coincidence stage and triggered thereby for energizing said bistable stage, and a normally de-energized alarm device in circuit with said bistable stage and energized in response to the energization of the latter, and a manual control operable to de-energize said bistable stage for de-energizing said alarm device.

8. Telegraph distortion monitoring apparatus, comprising a limiting amplifier stage adapted for connection to a telegraph loop to square up signal pulses fed thereto, first and second discriminator circuits connected in parallel at the output of said amplifier for providing simultaneous trigger pulses, a monostable multivibrator stage in circuit with said first discriminator circuit and triggered thereby to provide pulses of predetermined time duration, a coincidence gate stage in circuit with the output of said monostable multivibrator, said coincidence gate stage being in circuit also with said second discriminator circuit, said coincidence stage having parameters which result in the effective energization thereof only when the output trigger pulse from said second discriminator circuit coincides with the polarity of a time-duration pulse fed thereto from said monostable multivibrator and occurs within the time period of said time-duration pulse, a bistable multivibrator stage in circuit with the output of said coincidence gate stage and energized in response to the energization of said coincidence gate stage, and a normally de-energized alarm device at the output of said bistable multivibrator stage and energized in response to the energization of said bistable multivibrator stage.

9. Telegraph distortion monitoring apparatus, comprising a limiting amplifier stage adapted for connection to a telegraph loop to square up signal pulses fed thereto, first and second discriminator circuits connected in parallel at the output of said amplifier for providing simultaneous trigger pulses, a monostable multivibrator stage in circuit with said first discriminator circuit and triggered thereby to provide pulses of predetermined time duration, a coincidence gate stage in circuit with the output of said monostable multivibrator, said coincidence gate stage being in circuit also with said second discriminator circuit, said coincidence stage having parameters which result in the effective energization thereof only when the output from said second discriminator circuit coincides with the polarity of a time-duration pulse fed thereto from said monostable multivibrator and occurs within the time period of said time-duration pulse, a bistable multivibrator stage in circuit with the output of said coincidence gate stage and energized in response to the energization of said coincidence gate stage, and a normally de-energized alarm device at the output of said bistable multivibrator stage and energized in response to the energization of said bistable multivibrator stage, said monostable multivibrator stage having provision to vary the time duration of the pulses generated thereby.

10. Telegraph distortion monitoring apparatus, comprising a limiting amplifier stage adapted for connection to a telegraph loop to square up signal pulses fed thereto, first and second discriminator circuits connected in parallel at the output of said amplifier for providing simultaneous trigger pulses, a monostable multivibrator stage in circuit with said first discriminator and triggered thereby to provide pulses of predetermined time duration, a coincidence gate stage in circuit with the output of said monostable multivibrator, said coincidence gate stage being in circuit also with said second discriminator circuit to receive trigger pulses therefrom, said coincidence stage having means for effecting the effective energization thereof only when the output from said second discriminator circuit coincides with the polarity of a time-duration pulse fed thereto from said monostable multivibrator and occurs within the time period of said time-duration pulse, a bistable multivibrator stage in circuit with the output of said coincidence gate stage and energized in response to the energization of said coincidence gate stage, and a normally de-energized alarm device at the output of said bistable multivibrator stage and energized in response to the energization of said bistable multivibrator stage, and a manual control operable to de-energize said bistable stage for de-energizing said alarm device.

11. Telegraph distortion monitoring apparatus as set forth in claim 8, further characterized in that the various stages are constituted by vacuum tube circuits.

12. Telegraph distortion monitoring apparatus as set forth in claim 8, further characterized in that the various stages are constituted by transistor circuits.

13. A monitoring system, comprising means responsive to a pulse signal for providing a pulse of predetermined time duration, coincidence means in circuit with the output of said first mentioned means, said coincidence means also being in circuit with said pulse signal for receiving said pulse signal simultaneously with the receiving of said pulse signal by said first mentioned means, said coincidence means having means for providing an effective output therefrom only when said pulse signals coincide in polarity with said predetermined time-duration pulses from said first mentioned means and occur within the time period of said time-duration pulses.

14. A monitoring system, comprising means responsive to a pulse signal for providing a pulse of predetermined time duration, coincidence means in circuit with the output of said first mentioned means, said coincidence means also being in circuit with said pulse signal for receiving said pulse signal simultaneously with the receiving of said pulse signal by said first mentioned means, said coincidence means having means for providing an effective output therefrom only when said pulse signals coincide in polarity with said predetermined time-duration pulses from said first mentioned means and occur within the time period of said time-duration pulses, a normally de-energized alarm device, and means responsive to the output of said coincidence stage for energizing said alarm device.

15. A monitoring system, comprising means responsive to a pulse signal for providing a pulse of predetermined time duration, said means having control means to vary the time duration of said pulse, coincidence means in circuit with the output of said first mentioned means, said coincidence means also being in circuit with said pulse signal for receiving said pulse signal simultaneously with the receiving of said pulse signal by said first mentioned means, said coincidence means having means for providing an effective output therefrom only when said pulse signals coincide in polarity with said predetermined time-duration pulses from said first mentioned means and occur within the time period of said time-duration pulses, a normally de-energized alarm device, and means responsive to the output of said coincidence stage for energizing said alarm device.

16. A monitoring system, comprising means responsive to a pulse signal for providing a pulse of predetermined time duration, said means having control means to vary the time duration of said pulse, coincidence means in circuit with the output of said first mentioned means, said coincidence means also being in circuit with said pulse signal for receiving said pulse signal simultaneously with the receiving of said pulse signal by said first mentioned means, said coincidence means having means for providing an effective output therefrom only when said pulse signals coincide in polarity with said predetermined time-duration pulses from said first mentioned means and occur within the time period of said time-duration pulses, a normally de-energized alarm device, and means responsive to the output of said coincidence stage for energizing said alarm device, and a manual operable control for de-energizing said alarm device energizing means.

17. Automatic communications distortion monitoring system, comprising transmission means carrying communications signals whose distortion is to be measured, differentiating means coupled to said transmission means for simultaneously generating first and second control signals coincident in time with leading and trailing edges of the waveforms of said communications signals, said second control signals being inverse in polarity to said first control signals, a signal-generating circuit responsive to said first control signals for providing comparison signals selectively variable in time-duration with respect to said communications signals, circuit means coupling said second control signal generating and said comparison signal means to a coincidence circuit, said coincidence circuit comprising means for producing effective output only when said second control signals coincide in polarity with said comparison signals and occur within the time-duration thereof, and indicating means operable under the control of said coincidence circuit for indicating divergence of said communications signals from said comparison signals.

18. An automatic system for monitoring distortion of communications signals, comprising means for simultaneously providing first and second control pulses corresponding respectively with successive portions of said communications signals, a generating circuit responsive to said first control pulses for generating predetermined waveform signals having selected time-durations, and a coincidence circuit fed simultaneously by said second control pulses and said waveform signals, said coincidence circuit comprising means for providing effective output only when said second control pulses occur within said time-durations and have the polarity of said waveform signals, and indicating means operable under the control of said coincidence circuit.

19. A monitoring system for telegraph circuits, comprising an electronic triggering circuit for generating triggering waves corresponding to telegraph "mark" and "space" input signals, monostable generator means for feeding comparison waves of selected time-durations to a coincidence circuit, differentiating circuit means for simultaneously feeding pulses to said monostable means and said coincidence circuit respectively, said pulses corresponding respectively to successive portions of the waveforms of said triggering waves, said coincidence circuit comprising means for providing effective output only when pulses fed thereto from said differentiating circuit means coincide respectively with the polarity of said comparison waves from said monostable generator means and occur successively within the time-durations of said comparison waves and distortion indicator means actuable by said output to indicate failure of said "mark" and "space" signals to conform to said time-durations of said comparison waves.

20. An automatic telegraph signal distortion monitor comprising generator means for feeding comparison waves of selected time-durations to a coincidence circuit, triggering means responsive to telegraph signal waves to simultaneously feed sets of first and second triggering pulses respectively to said coincidence circuit and said generator means, said coincidence circuit comprising means normally providing no output and providing effective output only when said first triggering pulses have the same polarity as said comparison waves of said generator means and occur within said time-durations of said comparison means, and distortion indicator means responsive to said output.

References Cited in the file of this patent

UNITED STATES PATENTS

| | | |
|---|---|---|
| 2,268,222 | Peterson | Dec. 30, 1941 |
| 2,619,542 | Carver | Nov. 25, 1952 |